Patented Sept. 23, 1952

2,611,712

UNITED STATES PATENT OFFICE 2,611,712

METHOD OF PREPARING A CELLULATED GLASS BODY

Walter D. Ford, Port Allegany, Pa., assignor to Pittsburgh Corning Corporation, Allegheny County, Pa., a corporation of Pennsylvania No Drawing. Application January 12, 1949, Serial No. 70,601

9 Claims. (Cl. 106—40)

The present invention relates to the preparation of cellulated bodies having low density and low coefficients of heat transmission, and it has particular relation to the preparation of such bodies from glass forming materials.

One object of the invention is to provide a method of forming a low density cellular body of glass or glass-like material which method involves a minimum expenditure of time, apparatus and fuel.

This and other objects will be apparent from consideration of the following specification and the appended claims.

It has heretofore been proposed to form a bloated, highly cellular, or froth-like body of glass suitable for use as a heat insulation medium, as a low density element for life rafts, floats and other purposes by sintering finely pulverized glass admixed with a gassing agent in suitable molds. By such method, it is possible to prepare a body having heat insulation properties similar to cork but being resistant to permeation by water, moisture, or to chemical reaction, and further being fire- and verminproof. Of course, in such a process of preparing a cellular body, it is requisite that the glass be preformed by melting sand, soda, lime, borax, etc., cooled, and then subjected to a pulverizing operation. Subsequently, the glass in pulverulent form is admixed with a gassing agent and again heated to the temperature of sintering. Obviously, such method is uneconomical in fuel and in apparatus because a melting tank for the glass is required in which large amounts of fuel are consumed and subsequently a second furnace for heating molds filled with the crushed glass and a gassing agent are required.

In accordance with the provisions of the present invention, it is proposed substantially to reduce the number of operations involved in the preparation of cellulated or bloated glass and simultaneously to reduce the expenses of a tank, the expenditure of fuel and other requisites to the preparation of the glass by simply admixing raw glass batch ingredients in a finely pulverized state with a suitable gassing agent and heating the mixture to the sintering temperature in suitable molds.

In the practice of the invention, a raw batch may be prepared by the admixture of sand or other form of silica with the various fluxes employed in the conventional formulation of glass. Oxides, hydroxides, carbonates and sulfates, or mixtures thereof, of sodium and/or potassium are employed as alkali metal components. Divalent metals of the second group of the periodic table are included. Calcium and magnesium in the form of oxides or carbonates are the common ones and may be regarded, for purposes of the invention, as being equivalent to each other. The sum of the two should be somewhere near 25 to 45 parts per 55 parts of silica. Considerable amounts of borax, e. g. 5, 10 or 20 parts of borax per 55 parts silica may also be introduced. Since it contains alkali metal it can replace a part or all of that constituent. The boron replaces a part of the calcium and/or magnesium. Complex aluminum silicates such as sodium or potassium feldspar, nepheline syenite, clay, aplite etc. may be included. The amount may vary from zero to 15 or 25 parts per 55 parts of silica, though 5 to 15 parts would be a representative amount. Needless to say that the compounds will provide a part which can easily be determined of the alkali components. Some feldspars may also contain some calcium, which can be taken into account in formulating a batch. Other glass batch ingredients may be employed as in conventional glass formulations.

A general formulation would be approximately as follows:

| | Parts[1] |
|---|---|
| Silica | 55 |
| Soda ash or equivalent potassium compounds | 10 to 25 |
| Limestone or dolomite or mixture | 25 to 45 |
| Borax | 0 to 30 |
| Aluminum silicates (feldspar, nepheline syenite, clay, etc.) | 0 to 20 |

[1] Parts are by weight.

Oxides, such as sodium peroxide and calcium oxide may be substituted for carbonates and anhydrous borax may be substituted for hydrated borax in the above formulation. They will melt more rapidly to form glass than the compounds they replace. They, of course, will be employed in stoichiometric proportions for the materials they replace.

These should all be finely ground, e. g. to a screen of 200–300 or much finer if desired, e. g. to 800. They should be thoroughly admixed.

The mixture should also include gas producing agents or combinations designed to react at the temperature at which the batch sinters and softens into a coherent plastic mass, to form large volumes of gases without actually melting down. Finely divided carbon and oxygen supplying agents are especially favored as gas producing agents. The carbon is oxidized to form large volumes of gas at just about the correct temperature.

Forms of carbon satisfactory for the purpose include gas black, carbon black, lamp black, channel black, finely powdered coal, coke or charcoal, Carborundum, and the like usually in amounts of 0.1 to 5% by weight of the batch. Very finely divided forms, e. g. carbon black, are required in but small amounts, e. g. .2%.

The oxidizing agents include antimony trioxide, arsenic trioxide, nickel oxide, ferric oxide, manganese dioxide, sulphates of calcium or magnesium and others which are reduced at elevated temperatures by carbon to liberate oxygen containing gases, e. g. $CO_2$, $SO_2$ etc. The amount may be from .1 to 5, 10 or 15% by weight of the batch.

In some instances the oxidizing agent will supply a useful metal component to the batch and proper allowance may be made therefor in batch formulation. Often the sulfates inherently present in a glass batch will be sufficient to supply all oxygen required to reduce the carbonaceous material and no additional oxidizing agent will be required. The following would constitute a typical batch suitable for use in the process:

| | Parts [1] |
|---|---|
| Flint | 55 |
| Soda ash | 18 |
| Dolomitic limestone | 15 |
| Nepheline syenite | 12 |
| Antimony trioxide | 1 |
| Lampblack | 0.7 |

[1] Parts are given by weight.

It is understood that the batch as above given is merely representative of a modified lime soda glass suitable for use in the process. Considerable variation in the proportions of ingredients are permissible, and it is also permissible to add certain amounts of other ingredients such as borax or the like. The nepheline syenite may be replaced in part or entirely by feldspar. Antimony trioxide may be replaced by sodium sulphate. It is also permissible to incorporate into the batch appropriate amounts, e. g. 10 to 50% of glass cullet. The flint can be partly or completely replaced by a very finely divided mixture of silica and glass such as is obtained from the waste sand resulting in the plate glass industry from the grinding and polishing of glass plates with a slurry of sand as an abrasive. Such slurry ordinarily will contain about 20 or 25% of glass abraded from the surfaces of the plates undergoing grinding and polishing and the silica and glass will be broken down to a particle size corresponding on the average to 600 or 700 mesh per inch.

The raw batch ingredients may be placed in a suitable mold, for example, one of sheet alloy steel of high heat resistance. The amount added will depend upon the degree of cellulation expected in the finished product. Usually the mold will be approximately ⅟₇ filled. The mold preferably is initially coated with a water slurry of clay or bauxite and dextrin in order to render it non-adhesive to the cellulated material when it is formed. Subsequently, the molds are heated to a temperature sufficient to sinter but incompletely to melt the mixture contained therein. The time of heating, of course, will depend almost wholly upon the amount and the thickness of the layer of material in the molds. The powder is a poor conductor of heat and considerable time is required to effect uniform heating entirely throughout the mass. The mixture as it sinters and softens can be expected to bloat or cellulate as a result of the generation of gases which are entrapped in the sintered mass. The mass should become heated sufficiently hot to render it plastic or pastry, thus permitting the gases to expand to obtain the desired bloating action, but it should not be heated to the point of melting down to a fluid state since this would permit the entrapped gases to escape as bubbles. A temperature of 1400 to 1800 or 1900° F. dependent upon the mixture is satisfactory.

After the reaction of the gassing agent is completed, the bodies may be slightly cooled, e. g. 100–200° F. in order to effect slight shrinkage of the contents of the molds. Subsequently, the molds are subjected to thermal shock in order to expand them differentially and release the contents. The molds may then be removed and the resultant cellular product subjected to annealing in order to relieve the internal strains in the glass.

After the annealing operation, the product consists of particles of silica at least partially fused with the fluxes, form a body relatively impervious to water vapor but without actual melting down and commingling of the contiguous silica particles. The particles are welded together at points of contact to provide a frothy mass of sealed, impervious cells. The bodies are trimmed to size and shape and may then be employed for the usual purposes of cellular glass.

The forms of the invention herein illustrated are to be considered merely representative. It will be apparent to those skilled in the art that numerous modifications may be made therein without departure from the spirit of the invention or the scope of the appended claims.

This is a continuation in part of application Serial No. 590,115, filed April 24, 1945, now abandoned.

I claim:

1. A process of forming cellular glass bodies which comprises thoroughly admixing a mixture of the following composition:

| | Parts by weight |
|---|---|
| Flint | 55 |
| Soda ash | 18 |
| Dolomitic limestone | 15 |
| Nepheline syenite | 12 |
| Antimony trioxide | 1 |
| Lamp black | 0.7 | placing the mixture in a refractory mold in an amount of approximately ⅟₇ to fill it, then heating the mixture until a sintered, cohered, and bloated mass is formed without actual liquefaction.

2. A process of forming cellular glass-like bodies which comprises thoroughly admixing a composition comprising the following finely ground ingredients in approximately the weight proportions given:

| | Parts by weight |
|---|---|
| 1. Silica | 55 |
| 2. A compound selected from the group consisting of oxides, hydroxides, carbonates, sulfates and mixtures thereof, of an alkali metal | 10 to 25 |
| 3. A compound selected from the group consisting of oxides, hydroxides, carbonates, sulfates and mixtures thereof, of an alkaline earth metal | 25 to 45 |
| 4. Carbon | 0.1 to 5 |
| 5. Oxygen producing agent reducible by carbon | 0.1 to 10 | heating the mixture to a temperature sufficient to sinter and cellulate the mixture without prior actual liquefaction, then cooling and annealing the resultant cellulated mass.

3. A process as defined in claim 2 in which the mixture is introduced into a mold in an amount approximately ½ to fill it while it is being heated to the sintering temperatures.

4. A process as defined in claim 2 in which the mixture is heated to about 1400 to 1800° F.

5. A process of forming cellular glasslike bodies comprising admixing pulverulent raw glass batch ingredients in amounts which, if melted to liquid state would form glass, with finely divided carbon in amounts of 0.1% to 5.0% by weight and .01 to 15% by weight of an oxygen-producing agent adapted to be reduced by the carbon to release oxygen-containing gases at the sintering temperature of the raw glass batch, placing in a refractory mold an amount of such mixture sufficient to fill the mold when cellulated, heating the mixture to tempertaures of 1400° to 1800° F. to sinter and cellulate the mass without formation of fluid glass.

6. A process as defined in claim 5 in which the oxygen-producing agent is antimony trioxide.

7. A process of forming cellular glasslike bodies which comprises thoroughly admixing a composition comprising the following finely ground ingredients in approximately the weight proportions given:

| | Parts by weight |
|---|---|
| 1. Silica | 55 |
| 2. A compound selected from the group consisting of oxides, hydroxides, carbonates, sulfates and mixtures thereof, of an alkali metal | 10 to 25 |
| 3. A compound selected from the group consisting of oxides, hydroxides, carbonates, sulfates and mixtures thereof, of an alkaline earth metal | 25 to 45 |
| 4. Carbon | 0.1 to 5 |
| 5. Oxygen producing agent reducible by carbon | 0.1 to 10 |
| 6. Borax | 0.1 to 30 | heating the mixture to a temperature sufficient to sinter and cellulate the mixture without prior actual liquefaction, then cooling and annealing the resultant cellulated mass.

8. A process of forming cellular glasslike bodies which comprises thoroughly admixing a composition comprising the following finely ground ingredients in approximately the weight proportions given:

| | Parts by weight |
|---|---|
| 1. Silica | 55 |
| 2. A compound selected from the group consisting of oxides, hydroxides, carbonates, sulfates and mixtures thereof, of an alkali metal | 10 to 25 |
| 3. A compound selected from the group consisting of oxides, hydroxides, carbonates, sulfates and mixtures thereof, of an alkaline earth metal | 25 to 45 |
| 4. Carbon | 0.1 to 5 |
| 5. Oxygen producing agent reducible by carbon | 0.1 to 10 |
| 6. Aluminum silicate | 0.1 to 25 | heating the mixture to a temperature sufficient to sinter and cellulate the mixture without prior actual liquefaction, then cooling and annealing the resultant cellulated mass.

9. A process of forming cellular glasslike bodies which comprises thoroughly admixing a composition comprising the following finely ground ingredients in approximately the weight proportions given:

| | Parts by weight |
|---|---|
| 1. Silica | 55 |
| 2. A compound selected from the group consisting of oxides, hydroxides, carbonates, sulfates and mixtures thereof, of an alkali metal | 10 to 25 |
| 3. A compound selected from the group consisting of oxides, hydroxides, carbonates, sulfates and mixtures thereof, of an alkaline earth metal | 25 to 45 |
| 4. Carbon | 0.1 to 5 |
| 5. Oxygen producing agent reducible by carbon | 0.1 to 10 |
| 6. Borax | 0.1 to 30 |
| 7. Aluminum silicate | 0.1 to 25 | heating the mixture to a temperature sufficient to sinter and cellulate the mixture without prior actual liquefaction, then cooling and annealing the resultant cellulated mass.

WALTER D. FORD.

REFERENCES CITED

The following references are of record in the file of this patent:

UNITED STATES PATENTS

| Number | Name | Date |
|---|---|---|
| 2,337,672 | Long | Dec. 28, 1943 |

FOREIGN PATENTS

| Number | Country | Date |
|---|---|---|
| 447,805 | Great Britain | 1936 |